(12) United States Patent
Rusek (10) Patent No.: US 11,028,675 B2
(45) Date of Patent: Jun. 8, 2021

(54) HYDROGEN PEROXIDE STEAM GENERATOR FOR OILFIELD APPLICATIONS

(71) Applicant: Global Oil EOR Systems, Ltd., Boca Raton, FL (US)

(72) Inventor: John J. Rusek, Lafayette, IN (US)

(73) Assignee: GLOBAL OIL EOR SYSTEMS, LTD., Boca Raton, FL (US)

( * ) Notice: Subject to any disclaimer, the term of this patent is extended or adjusted under 35 U.S.C. 154(b) by 0 days.

(21) Appl. No.: 14/826,912

(22) Filed: Aug. 14, 2015

(65) Prior Publication Data

US 2016/0047211 A1    Feb. 18, 2016

Related U.S. Application Data

(60) Provisional application No. 62/038,154, filed on Aug. 15, 2014.

(51) Int. Cl.
*E21B 43/24*   (2006.01)
*F22B 3/00*    (2006.01)
*C09K 8/84*    (2006.01)

(52) U.S. Cl.
CPC .............. *E21B 43/24* (2013.01); *C09K 8/845* (2013.01); *F22B 3/00* (2013.01)

(58) Field of Classification Search
None
See application file for complete search history.

(56) References Cited

U.S. PATENT DOCUMENTS

| | | |
|---|---|---|
| 2,657,753 A | 11/1953 | Carpenter |
| 2,680,486 A | 6/1954 | Carpenter |
| 2,680,487 A | 6/1954 | Carpenter |

(Continued)

FOREIGN PATENT DOCUMENTS

| | | |
|---|---|---|
| CA | 511463 A | 3/1955 |
| CO | 35310 | 5/2019 |

(Continued)

OTHER PUBLICATIONS

International Preliminary Report on Patentability dated Mar. 2, 2017 in corresponding PCT Application PCT/US2015/045336; 10 pages.

(Continued)

*Primary Examiner* — Charles R Nold
(74) *Attorney, Agent, or Firm* — Foley & Lardner LLP (57) ABSTRACT

Exemplary apparatuses, systems, and methods are provided to produce steam for use in oil field applications. In some embodiments, a catalyst is provided that includes a plurality of ceramic bodies impregnated with an alkaline-promoted manganese oxide. In other embodiments, the catalyst includes a plurality of bodies formed of an active ceramic oxide in a consolidated state without an underlying ceramic body. The bodies are contacted with a liquid hydrogen peroxide having a strength, in one embodiment, between about 30 and about 70 weight percent to produce steam. The steam is directed to an oil field application, such as, but not limited to, a geologic formation to increase oil production from the geologic formation, an applicator to clean oilfield equipment, a heat exchanger to heat hydrogen peroxide, or a heat exchanger to heat living quarters.

22 Claims, 6 Drawing Sheets

(56) References Cited

U.S. PATENT DOCUMENTS

| | | | |
|---|---|---|---|
| 2,721,788 A | 10/1955 | Schad | |
| 2,863,510 A | 12/1958 | Tadema et al. | |
| 2,871,941 A | 2/1959 | Allen et al. | |
| 2,871,942 A | 2/1959 | Allen et al. | |
| 3,091,520 A | 5/1963 | Newburn | |
| 3,127,935 A | 4/1964 | Poettmann et al. | |
| 3,135,089 A | 6/1964 | Dryden | |
| 3,235,006 A * | 2/1966 | Hujsak | E21B 36/00 166/302 |
| 3,447,316 A | 6/1969 | White | |
| 3,488,962 A | 1/1970 | McCormick | |
| 3,700,035 A | 10/1972 | Lange | |
| 3,884,836 A | 5/1975 | Kuhl et al. | |
| 3,887,696 A | 6/1975 | Bernard et al. | |
| 3,898,794 A | 8/1975 | Ariga | |
| 3,952,089 A | 4/1976 | Kabisch et al. | |
| 3,969,899 A | 7/1976 | Nakazawa et al. | |
| 3,982,592 A | 9/1976 | Hamrick et al. | |
| 4,067,787 A | 1/1978 | Kastening et al. | |
| 4,069,664 A | 1/1978 | Ellion et al. | |
| 4,292,208 A | 9/1981 | Baldi et al. | |
| 4,337,031 A | 6/1982 | Gardner et al. | |
| 4,385,661 A | 5/1983 | Fox | |
| 4,423,780 A | 1/1984 | Vigneri et al. | |
| 4,430,176 A | 2/1984 | Davison | |
| 4,455,203 A | 6/1984 | Stucki | |
| 4,456,069 A | 6/1984 | Vigneri | |
| 4,475,596 A | 10/1984 | Papst | |
| 4,484,992 A | 11/1984 | Buhler et al. | |
| 4,574,076 A | 3/1986 | Castrantas | |
| 4,678,039 A | 7/1987 | Rivas et al. | |
| 4,752,461 A | 6/1988 | Coeckelberghs et al. | |
| 4,781,988 A | 11/1988 | Rusek et al. | |
| 4,861,560 A | 8/1989 | Nakajima | |
| 4,867,238 A | 9/1989 | Bayless et al. | |
| 4,882,122 A | 11/1989 | Head et al. | |
| 4,897,252 A | 1/1990 | Cochran et al. | |
| 4,927,798 A | 5/1990 | Baldi | |
| 4,967,840 A | 11/1990 | Miller | |
| 4,985,228 A | 1/1991 | Kirksey | |
| 5,002,920 A * | 3/1991 | Yoshimoto | B01D 53/8675 502/324 |
| 5,025,863 A | 6/1991 | Haines et al. | |
| 5,055,286 A | 10/1991 | Watanabe et al. | |
| 5,077,257 A | 12/1991 | Baldi | |
| 5,112,702 A | 5/1992 | Berzins et al. | |
| 5,180,573 A | 1/1993 | Hiramatsu et al. | |
| 5,215,665 A | 6/1993 | Crofts et al. | |
| 5,401,589 A | 3/1995 | Palmer et al. | |
| 5,705,040 A | 1/1998 | Johnsson et al. | |
| 5,711,146 A | 1/1998 | Armstrong et al. | |
| 5,884,642 A | 3/1999 | Broadbent | |
| 5,932,837 A | 8/1999 | Rusek et al. | |
| 5,984,010 A | 11/1999 | Elias et al. | |
| H1948 H | 3/2001 | Rusek et al. | |
| H1948 H | 3/2001 | Rusek et al. | |
| 6,255,009 B1 | 7/2001 | Rusek et al. | |
| 6,261,484 B1 | 7/2001 | Phillips et al. | |
| 6,756,021 B2 | 6/2004 | Botrel | |
| 6,872,261 B2 | 3/2005 | Stengel | |
| 6,880,491 B2 | 4/2005 | Reiner et al. | |
| 6,991,772 B1 | 1/2006 | Rusek | |
| 7,066,257 B2 | 6/2006 | Wellington et al. | |
| 7,344,799 B2 | 3/2008 | Rusek | |
| 7,431,900 B2 | 10/2008 | Hill et al. | |
| 7,506,685 B2 | 3/2009 | Zubrin et al. | |
| 8,020,614 B2 | 9/2011 | Hobson, III et al. | |
| 8,047,285 B1 | 11/2011 | Smith | |
| 8,049,048 B2 | 11/2011 | Rusek et al. | |
| 8,344,193 B2 | 1/2013 | Rusek et al. | |
| 8,349,758 B2 | 1/2013 | Gabriel et al. | |
| 8,552,232 B2 | 10/2013 | Rusek et al. | |
| 8,556,999 B2 | 10/2013 | Rusek et al. | |
| 8,686,202 B2 | 4/2014 | Rusek et al. | |
| 2004/0072044 A1 | 4/2004 | Rusek et al. | |
| 2004/0098984 A1 | 5/2004 | Duell et al. | |
| 2005/0022911 A1 | 2/2005 | Rusek et al. | |
| 2005/0115651 A1 | 6/2005 | Rusek et al. | |
| 2005/0175878 A1 | 8/2005 | Rusek | |
| 2007/0056738 A1 | 3/2007 | Miller | |
| 2008/0053065 A1 | 3/2008 | Hobson et al. | |
| 2008/0087434 A1 * | 4/2008 | Wilen | B08B 9/027 166/312 |
| 2008/0168706 A1 | 7/2008 | Rusek et al. | |
| 2008/0244961 A1 | 10/2008 | Rusek et al. | |
| 2009/0008090 A1 | 1/2009 | Schultz et al. | |
| 2009/0148379 A1 | 6/2009 | Love et al. | |
| 2009/0223678 A1 | 9/2009 | Richard et al. | |
| 2010/0089574 A1 | 4/2010 | Wideman et al. | |
| 2010/0268005 A1 | 10/2010 | Rusek et al. | |
| 2010/0276146 A1 | 11/2010 | Smith | |
| 2010/0294493 A1 * | 11/2010 | Goodwin | E21B 43/24 166/264 |
| 2010/0298615 A1 | 11/2010 | Rusek et al. | |
| 2011/0088311 A1 | 4/2011 | Bower et al. | |
| 2011/0230686 A1 | 9/2011 | Rusek et al. | |
| 2011/0244357 A1 | 10/2011 | Rusek et al. | |
| 2011/0300018 A1 * | 12/2011 | Twigg | B01J 37/0215 422/4 |
| 2012/0059205 A1 | 3/2012 | Rusek | |
| 2013/0143293 A1 | 6/2013 | Rusek et al. | |
| 2013/0161002 A1 | 6/2013 | Wigand | |
| 2014/0045239 A1 | 2/2014 | Rusek et al. | |
| 2014/0066671 A1 | 3/2014 | Rusek et al. | |

FOREIGN PATENT DOCUMENTS

| | | |
|---|---|---|
| EA | 200900377 A1 | 6/2009 |
| EP | 2988065 A1 | 2/2016 |
| EP | 3 628 921 A1 | 4/2020 |
| GB | 1 399 042 A | 6/1975 |
| JP | 3-218904 B2 | 10/2001 |
| RU | 2283949 C1 | 9/2006 |
| SU | 1673504 A1 | 8/1991 |
| WO | WO-03/098104 A2 | 11/2003 |
| WO | WO-2008/028015 A2 | 3/2008 |
| WO | WO-2008/048817 A2 | 4/2008 |
| WO | WO-2015/180992 A1 | 12/2015 |
| WO | WO 2015/193726 A1 | 12/2015 |

OTHER PUBLICATIONS

EP Search Report of EP Application 15181183.3 dated Jan. 21, 2016.

Mills, KJ., Ceramics and Catalysis. Saint-Gobain NorPro 2005, Retrieved online http:www.norpro.saint-gobain.com/uploadedFiles/SGnorpro/Documents/Ceramics Catalysis-Mills-Rev0307, p. 2, col. 2, paragraph 2, 6 pages.

International Search Report and Written Opinion dated Nov. 23, 2015 in corresponding PCT Application PCT/US2015/45336; 13 pages.

EP Amendment of Application 15181183.3 dated Aug. 26, 2016 (30 Pgs.).

Brief in Response to Office Action No. 5953 in Colombian Patent App. No. NC2017/0002482 dated Feb. 10, 2017, filed Jun. 24, 2017.

EP Application No. 15 181 183.3, Office Action dated Jul. 10, 2018, 6 pgs.

Brodrecht, David J., and Rusek, John J., "Aluminum-Hydrogen Peroxide Fuel-Cell Studies," Applied Energy, 74, 2003, pp. 113-124.

Corpening, J.,H., Palmer, R.K., Heister, S.D., and Rusek, J.J., "Combustion of Advanced Non-toxic Hybrid Propellants," International Journal of Alternative Propulsion, vol. 1, No. 2/3, 2007, pp. 154-173.

Luo, N., Miley, G., Gimlin, R., Burton, R., & Rusek, J., Holcomb, F., "Hydrogen-Peroxide-Based Fuel Cells for Space Power Systems," Journal of Propulsion and Power, 24, 2008, pp. 583-589.

(56) References Cited

OTHER PUBLICATIONS

Prater, Daniel N., and Rusek, John J., "Energy Density of a Methanol/Hydrogen-Peroxide Fuel Cell," Applied Energy, 74, 2003, pp. 135-140.

\* cited by examiner

Fig.6

| Well Test #1, 54 hours total 500 psig nominal 60% $H_2O_2$ | | | |
|---|---|---|---|
| Canister | Temp (°F) | Pressure (psi) | Flow (gpm) |
| A | 380 | 380 | 0.5 |
| A | 420 | 500 | 0.58 |
| A | 420 | 490 | 0.5 |
| A | 420 | 500 | 0.5 |
| A | 400 | 380 | 0.58 |
| A | 425 | 500 | 0.5 |
| A | 420 | 500 | 0.4 |
| A | 420 | 500 | 0.5 |
| A | 420 | 500 | 0.4 |
| A | 420 | 500 | 0.5 |
| A | 420 | 480 | 0.4 |
| A | 420 | 480 | 0.5 |
| A | 420 | 490 | 0.58 |
| A | 420 | 490 | 0.5 |
| A | 420 | 500 | 0.5 |
| A |  | 0 |  |
| A |  | 0 |  |
| B | 440 | 500 | 0.91 |
| B | 420 | 500 | 0.9 |
| B | 420 | 500 | 1.3 |
| B | 415 | 490 | 0.5 |
| B | 415 | 480 | 1.58 |
| B | 415 | 500 | 0.3 |
| B | 360 | 375 | 0.16 |
| B&C | 430 | 500 | 0.59 |
| B&C | 430 | 510 | 0.66 |
| B&C | 430 | 510 | 0.75 |
| B&C | 430 | 510 | 0.75 |
| B&C | 425 | 500 | 1.41 |
| B&C | 425 | 500 | 0.66 |
| B&C | 425 | 500 | 0.75 |
| B&C | 425 | 500 | 0.6 |
| B&C | 430 | 490 | 0.75 |
| B&C | 430 | 510 | 0.75 |

| Well Test #1, 54 hours total 500 psig nominal 60% $H_2O_2$ | | | |
|---|---|---|---|
| Canister | Temp (°F) | Pressure (psi) | Flow (gpm) |
| B&C | 430 | 510 | 1.5 |
| B&C | 430 | 510 | 0.6 |
| B&C | 430 | 510 | 0.75 |
| B&C | 430 | 510 | 0.75 |
| B&C | 480 | 400 | 0.5 |
| B&C | 350 | 400 | 0.3 |
| B&C | 440 | 480 | 0.3 |
| D&E | 425 | 490 | 0.5 |
| D&E | 425 | 500 | 0.6 |
| D&E | 425 | 500 | 0.3 |
| D&E |  | 420 |  |
| D&E | 425 | 510 | 1.16 |
| D&E | 420 | 500 | 0.4 |
| D&E | 420 | 500 | 0.5 |
| D&E | 430 | 510 | 0.5 |
| D&E | 430 | 510 | 1.25 |
| D&E | 430 | 500 | 1.16 |
| D&E | 420 | 500 | 1.66 |
| D&E | 430 | 500 | 1.16 |
| D&E | 420 | 500 | 1.16 |
| D&E | 450 | 1.16 | 2 |

| Well Test #2, 91 hours total 500 psig nominal 60% H$_2$O$_2$ | | | |
|---|---|---|---|
| Canister | Temp (°F) | Pressure (psi) | Flow (gpm) |
| F | 200 | 200 | 0.1 |
| F&G |  | 200 |  |
| F&G |  | 200 |  |
| F&G |  | 200 |  |
| F&G | 400 | 400 | 0.2 |
| F&G | 400 | 400 | 0.2 |
| F&G |  | 200 |  |
| F&G | 400 | 400 | 0.2 |
| F&G |  | 300 |  |
| F&G |  | 0 |  |
| F&G |  | 0 |  |
| F&G | 415 | 460 | 0.25 |
| F&G | 410 | 450 | 0.25 |
| F&G |  | 400 |  |
| F&G | 380 | 420 | 0.25 |
| F&G | 385 | 430 | 0.25 |
| F&G | 390 | 430 | 0.25 |
| F&G | 400 | 440 | 0.3 |
| F&G |  | 300 |  |
| H | 400 | 420 | 0.3 |
| H | 420 | 500 | 0.3 |
| H | 425 | 500 | 0.3 |
| H | 425 | 500 | 0.3 |
| H | 410 | 480 | 0.3 |
| H | 420 | 500 | 0.3 |
| H | 425 | 500 | 0.3 |
| H | 425 | 500 | 0.3 |
| H | 425 | 500 | 0.3 |
| H | 425 | 500 | 0.3 |
| H | 425 | 500 | 0.3 |
| H | 425 | 500 | 0.3 |
| H | 425 | 500 | 0.3 |
| H | 425 | 500 | 0.3 |
| H | 425 | 500 | 0.3 |

| Well Test #2, 91 hours total 500 psig nominal 60% H$_2$O$_2$ | | | |
|---|---|---|---|
| Canister | Temp (°F) | Pressure (psi) | Flow (gpm) |
| H | 425 | 500 | 0.3 |
| H | 430 | 480 | 0.3 |
| H | 430 | 500 | 0.3 |
| H | 430 | 500 | 0.3 |
| H | 430 | 500 | 0.3 |
| H | 430 | 500 | 0.3 |
| H | 420 | 500 | 0.3 |
| H | 410 | 480 | 0.3 |
| H |  | 0 |  |
| I |  | 250 |  |
| I | 410 | 450 | 0.3 |
| I | 420 | 480 | 0.3 |
| I | 420 | 500 | 0.3 |
| I | 420 | 500 | 0.3 |
| I | 420 | 500 | 0.3 |
| I | 420 | 500 | 0.3 |
| I | 420 | 500 | 0.3 |
| I | 420 | 500 | 0.3 |
| I | 420 | 500 | 0.3 |
| I | 420 | 500 | 0.2 |
| I | 420 | 500 | 0.2 |
| I | 420 | 500 | 0.2 |
| I | 410 | 500 | 0.2 |
| I | 420 | 500 | 0.2 |
| I | 410 | 500 | 0.3 |
| I | 420 | 500 | 0.3 |
| I | 420 | 500 | 0.3 |
| I | 420 | 500 | 0.3 |
| I | 420 | 500 | 0.3 |
| I | 420 | 500 | 0.5 |
| I | 420 | 500 | 0.4 |
| I | 410 | 500 | 0.4 |
| J |  | 0 |  |

*Fig.9A*

| Well Test #2, 91 hours total 500 psig nominal 60% H₂O₂ | | | |
|---|---|---|---|
| Canister | Temp (°F) | Pressure (psi) | Flow (gpm) |
| J | 420 | 500 | 0.91 |
| J | 420 | 500 | 0.4 |
| J | 420 | 500 | 0.4 |
| J | 425 | 500 | 0.4 |
| J | 425 | 500 | 0.3 |
| J | 420 | 500 | 0.4 |
| J | 420 | 500 | 0.3 |
| J | 420 | 500 | 0.3 |
| J | 420 | 500 | 0.4 |
| J | 420 | 500 | 0.4 |
| J | 420 | 500 | 0.4 |
| J | 420 | 510 | 0.5 |
| J | 420 | 510 | 0.5 |
| J | 420 | 500 | 0.5 |
| J | 420 | 500 | 0.5 |
| J | 420 | 510 | 0.5 |
| J | 420 | 510 | 0.5 |
| J | 420 | 500 | 0.5 |
| J | 420 | 500 | 0.5 |
| J | 420 | 500 | 0.5 |
| J | 420 | 500 | 0.4 |
| J | 410 | 500 | 0.4 |

*Fig.9B*

HYDROGEN PEROXIDE STEAM GENERATOR FOR OILFIELD APPLICATIONS

CROSS-REFERENCE TO RELATED APPLICATIONS

This application claims priority from, and hereby incorporates by reference for all purposes, U.S. Provisional Patent Ser. No. 62/038,154, entitled Hydrogen Peroxide Steam Generator for Oilfield Applications, naming John J. Rusek as inventor, and filed Aug. 15, 2014.

TECHNICAL FIELD

This disclosure relates in general to apparatuses, systems and methods to create steam from a liquid, such as, for example, liquid hydrogen peroxide solutions, and, in one embodiment, for example, to apparatuses, systems and methods to create steam from moderate strength liquid hydrogen peroxide solutions.

BACKGROUND OF THE DISCLOSURE

The production rate of an oil well depends on several factors, including, for example, the viscosity of the oil and the flow rate of oil through the casing pipe, production tubing, and/or oil formation. The production of an oil well often diminishes over time due to obstructions that form in the perforated casing pipe, the production tubing, and/or the oil formation. In some instances, for example, paraffin wax from the petroleum crude may become lodged in and around openings in the perforated casing pipe until one or more of the openings becomes blocked. Obstructions in the perforated casing pipe, the production tubing and/or the oil formation limit the flow of petroleum and thus slow production from the well. In other instances, solids in the oil may obstruct and impair the capability of oil to flow during the production phase of an oil well. In addition, a formation may include heavy oils that naturally have a high viscosity and, thus, move more slowly through the casing pipe, production tubing and/or oil formation.

To remove obstructions in the casing pipe, the production tubing, and/or oil formation, and/or to lower the viscosity and/or increase the flow rate of heavy oils, steam may be pumped into the production tubing and/or oil formation. Heat from the steam can lower the viscosity and/or increase the flow rate of heavy oil to increase the flow through the reservoir and up to the surface in a process known as enhanced oil recovery. The steam used in enhanced oil recovery may also be used for other oilfield operations, such as, for example, cleaning pipelines, tanks, and other oilfield equipment.

The steam used in enhanced oil recovery and other oilfield operations is traditionally generated using expensive boiler systems and steam piping systems that are constructed onsite at the oil well or adjacent to an oil field. These boiler systems are expensive to construct, maintain, and operate. Further, such systems are expensive to transport and assemble/disassemble at the well site. The steam/water vapors generated by these boiler systems is produced through the combustion of fossil fuels which produce contaminants such as SOx, NOx, and green house contributors. Other boiler systems generate steam/water vapor through the reaction of high strength, liquid hydrogen peroxide with a catalyst in a casing or vessel. The catalyst is often very expensive and becomes poisoned by elements of the liquid used to generate steam, thus rendering the catalyst unable to produce steam. The high strength liquid peroxide is also expensive and is often dangerous to transport and use if not handled with extreme care.

SUMMARY

The apparatuses, systems and methods described herein, in one embodiment, but not by way of limitation, use moderate strength liquid hydrogen peroxide to produce steam for injection into an oil well as part of enhanced oil recovery or for other oilfield operations, such as cleaning oilfield equipment, heating the hydrogen peroxide or other liquids, heating living quarters at an oilfield location, or other uses. As described in more detail below, the catalyst of the apparatuses, systems and methods is relatively inexpensive to make and is resistant to flooding and poisoning when used with a moderate strength hydrogen peroxide solution. The use of moderate strength liquid hydrogen peroxide reduces the overall cost of the system and reduces risks associated with transporting and reacting liquid hydrogen peroxide.

In a first aspect, there is a provided a method for producing steam for use in oilfield applications, such as stimulating a geologic formation to increase oil production. The method may include providing a catalyst that includes a plurality of ceramic bodies impregnated with an alkaline-promoted manganese oxide and contacting the catalyst with a liquid hydrogen peroxide having a strength between about 30 and about 70 weight percent to produce steam. The method may also include injecting the steam into a geologic formation to increase oil production from the geologic formation.

In some embodiments, the liquid hydrogen peroxide has a strength of between about 50 and about 65 weight percent.

In other embodiments, the liquid hydrogen peroxide has a strength of about 60 weight percent.

In still other embodiments, the liquid hydrogen peroxide has a strength below a self-heat strength of the liquid hydrogen peroxide.

In yet other embodiments, the ceramic bodies are spheres.

In yet another embodiment, the ceramic bodies have a diameter of between about 0.0625 inches and about 0.25 inches.

In some embodiments, each of the ceramic bodies has one of three distinct diameters.

In other embodiments, the three distinct diameters are 0.25 inches, 0.125 inches and 0.0625 inches.

In another embodiment, the ceramic bodies are closely packed in a container.

In yet another embodiment, a reaction of the liquid hydrogen peroxide and the catalyst occurs at a temperature below the self-heating strength of the liquid hydrogen peroxide.

In other embodiments, the alkaline-promoted manganese oxide catalyst is formed by the dehydration and calcining of alkaline permanganates such as potassium, sodium, and/or calcium permanganates.

In yet another embodiment, the alkaline-promoted manganese oxide includes the calcined product of sodium permanganate.

In still other embodiments, the alkaline-promoted manganese oxide catalyst is formed by the dehydration and calcining of sodium manganate.

In some embodiments, the alkaline-promoted manganese oxide catalyst is formed by dehydration and calcining of alkaline manganates.

In still other embodiments, the alkaline-promoted manganese oxide is formed by the dehydration and calcining of fugitive manganese compounds to form manganese oxides and the addition of one or more alkaline promoters during impregnation.

In still other embodiments, the alkaline-promoted manganese oxide includes alkaline-promoted manganese dioxide.

In other embodiments, the alkaline-promoted manganese oxide includes the calcined product of potassium permanganate.

In yet other embodiments, the steam has a pressure up to about 1,500 psi.

In a second aspect, there is described an apparatus for producing steam for use in oilfield applications, such as, but not limited to, stimulating a geologic formation to increase oil production. In some embodiments, the apparatus includes a catalyst that includes a plurality of ceramic bodies impregnated with an alkaline-promoted manganese oxide. The apparatus may also include a liquid hydrogen peroxide source, wherein the liquid hydrogen peroxide source includes liquid hydrogen peroxide having a strength between about 30 and about 70 weight percent. The apparatus may also include a first conduit coupling the liquid hydrogen peroxide source to the catalyst, and a second conduit coupling the catalyst to a geologic formation.

In some embodiments, the ceramic bodies are spheres.

In other embodiments, the ceramic bodies have a diameter between about 0.0625 inches and about 0.25 inches.

In yet other embodiments, the liquid hydrogen peroxide has a strength below a strength required to reach a self-heat temperature during a reaction with the catalyst.

In still other embodiments, the catalyst and the liquid hydrogen peroxide source are located remotely from the geologic formation.

In a third aspect, there is described a method of manufacturing an apparatus for producing steam for use in oilfield applications, such as, but not limited to, stimulating a geologic formation to increase oil production. In some embodiments, the method includes providing a catalyst, wherein providing a catalyst includes: providing a plurality of ceramic bodies; impregnating or soaking the plurality of ceramic bodies in a catalytic solution; drying the plurality of ceramic bodies; and calcining the plurality of ceramic bodies. The method may also include providing a liquid hydrogen peroxide source and coupling the liquid hydrogen peroxide source to the catalyst. The method may also include coupling the catalyst to a steam dispenser or a geologic formation.

In another embodiment, drying the plurality of ceramic bodies includes placing the plurality of ceramic bodies in an oven at about 150 degrees Celsius.

In other embodiments, soaking the plurality of ceramic bodies in a catalytic solution includes soaking the plurality of ceramic bodies for less than about 1 hour.

In still other embodiments, calcining the plurality of ceramic bodies includes placing the ceramic bodies in an oven at between about 200 and about 500 degrees Celsius.

In other embodiments, the liquid hydrogen peroxide source includes liquid hydrogen peroxide having a strength between about 30 and about 70 weight percent.

In another embodiment, the liquid hydrogen peroxide source includes liquid hydrogen peroxide having a strength between about 50 about 65 weight percent.

In a fourth aspect, there is provided a method for producing steam for use in stimulating a geologic formation to increase oil production. The method includes providing a plurality of bodies comprising an active metal oxide and contacting the plurality of bodies with a liquid hydrogen peroxide having a strength between about 30 and about 70 weight percent to produce steam. The method may also include injecting the steam into a geologic formation.

In some embodiments, the active metal oxide includes manganese dioxide.

In other embodiments, the active metal oxide includes alkaline-promoted manganese oxide.

In yet other embodiments, the plurality of bodies consist essentially of an alkaline-promoted manganese oxide.

In another embodiment, the liquid hydrogen peroxide has a strength of between about 50 and about 65 weight percent.

In yet another embodiment, the liquid hydrogen peroxide has a strength of about 60 weight percent.

In still another embodiment, the liquid hydrogen peroxide has a strength below a self-heat strength of the liquid hydrogen peroxide.

In some embodiments, the plurality of bodies have a diameter of between about 0.0625 inches and about 0.25 inches.

In other embodiments, the plurality of bodies have three distinct diameters.

In still other embodiments, the three distinct diameters are 0.25 inches, 0.125 inches and 0.0625 inches.

In another embodiment, the plurality of bodies are closely packed in a container.

In some embodiments, a reaction of the liquid hydrogen peroxide and the catalyst occurs at a temperature below the self-heating strength of the liquid hydrogen peroxide.

In a fifth aspect, there is provided an apparatus for producing steam for use in stimulating a geologic formation to increase oil production. In some embodiments, the apparatus includes a catalyst that has a plurality of bodies consisting essentially of an active metal oxide. In some embodiments, the apparatus includes a liquid hydrogen peroxide source that includes liquid hydrogen peroxide having a strength between about 30 and about 70 weight percent. The apparatus may also include a first conduit coupling the liquid hydrogen peroxide source to the catalyst; and a second conduit coupling the catalyst to a geologic formation.

In some embodiments, the active metal oxide is an alkaline-promoted manganese oxide.

In another embodiment, the plurality of bodies are spheres.

In a sixth aspect, there is provided a method for producing steam for use in stimulating a geologic formation that includes providing a catalyst that includes a plurality of ceramic bodies impregnated with manganese oxide; contacting the catalyst with a liquid hydrogen peroxide having a strength between about 30 and about 70 weight percent to produce steam; and injecting the steam into a geologic formation.

In some embodiments, the liquid hydrogen peroxide has a strength of between about 50 and about 65 weight percent.

In other embodiments, the liquid hydrogen peroxide has a strength of about 60 weight percent.

In yet other embodiments, the liquid hydrogen peroxide has a strength below a self-heat strength of the liquid hydrogen peroxide.

In still other embodiments, the ceramic bodies include spheres.

In another embodiment, the spherical ceramic bodies have a diameter of between about 0.0625 inches and about 0.25 inches.

In yet another embodiment, the spherical ceramic bodies have at least three distinct diameters.

In still another embodiment, the at least three distinct diameters include diameters of about 0.25 inches, 0.125 inches and 0.0625 inches.

In some embodiments, the ceramic bodies are closely packed in a container.

In other embodiments, the manganese oxide includes an alkaline-promoted manganese oxide that includes the calcined product of sodium permanganate.

In yet other embodiments, the manganese oxide includes alkaline-promoted manganese dioxide.

In still other embodiments, the manganese oxide includes an alkaline-promoted manganese oxide that includes the calcined product of potassium permanganate.

In another embodiment, the steam has a pressure up to about 1,500 psi.

In a seventh aspect, there is provided an apparatus for producing steam for use in stimulating a geologic formation, the apparatus includes a catalyst that includes a plurality of ceramic bodies impregnated with an alkaline-promoted manganese oxide; a liquid hydrogen peroxide source, wherein the liquid hydrogen peroxide source includes liquid hydrogen peroxide having a strength between about 30 and about 70 weight percent; a first coupling configured to provide a first fluid communication pathway between the liquid hydrogen peroxide source and the catalyst; and a second coupling configured to provide a second fluid communication pathway between the catalyst and a geologic formation.

In some embodiments, the ceramic bodies include spheres.

In other embodiments, a portion of the spherical ceramic bodies have a diameter between about 0.0625 inches and about 0.25 inches.

In still other embodiments, the liquid hydrogen peroxide has a strength below a self-heat strength of the liquid hydrogen peroxide.

In yet other embodiments, the catalyst and the liquid hydrogen peroxide source are located remotely from the geologic formation.

In an eighth aspect, there is provided a method of manufacturing an apparatus for producing steam for use in stimulating a geologic formation, the method including providing a catalyst, wherein providing a catalyst includes providing a plurality of ceramic bodies, impregnating the plurality of ceramic bodies in a catalytic solution, drying the plurality of ceramic bodies, and calcining the plurality of ceramic bodies; providing a liquid hydrogen peroxide source; providing a first fluid communication pathway between the liquid hydrogen peroxide source and the catalyst; and providing a second fluid communication pathway between the catalyst and a geologic formation.

In some embodiments, drying the plurality of ceramic bodies includes placing the plurality of ceramic bodies in an oven above about 150 degrees Celsius.

In other embodiments, impregnating the plurality of ceramic bodies in a catalytic solution includes soaking the plurality of ceramic bodies for less than about one hour.

In yet other embodiments, calcining the plurality of ceramic bodies includes heating the ceramic bodies in an oven at between about 200 and about 500 degrees Celsius.

In still other embodiments, the liquid hydrogen peroxide source includes liquid hydrogen peroxide having a strength between about 30 and about 70 weight percent.

In another embodiment, the liquid hydrogen peroxide source includes liquid hydrogen peroxide having a strength between about 50 about 65 weight percent.

In a ninth aspect, there is provided a method for producing steam for use in stimulating a geologic formation, the method including providing a plurality of bodies including an active metal oxide, and wherein at least a portion of the plurality of bodies are provided in a spherical configuration; contacting the plurality of bodies with a liquid hydrogen peroxide having a strength between about 30 and about 70 weight percent to produce steam; and injecting the steam into a geologic formation.

In some embodiments, the active metal oxide includes manganese dioxide.

In other embodiments, the active metal oxide includes alkaline-promoted manganese oxide.

In yet other embodiments, the active metal oxide includes one or more element selected from the group consisting of: Mn, Ag, Ru, Pb, V, Cr, Co, Cu and Pt.

In another embodiment, the plurality of bodies consists essentially of an alkaline-promoted manganese oxide.

In yet another embodiment, the liquid hydrogen peroxide has a strength of between about 50 and about 65 weight percent.

In some embodiments, the liquid hydrogen peroxide has a strength of about 60 weight percent.

In other embodiments, a portion of the plurality of bodies that are provided in a spherical configuration have a diameter of between about 0.0625 inches and about 0.25 inches.

In some embodiments, a portion of the plurality of bodies that are provided in a spherical configuration have at least three distinct diameters.

In another embodiment, the at least three distinct diameters include diameters of about 0.25 inches, 0.125 inches and 0.0625 inches.

In yet another embodiment, the plurality of bodies are closely packed in a container.

In still another embodiment, a reaction of the liquid hydrogen peroxide and the catalyst occurs at a temperature below the self-heating strength of the liquid hydrogen peroxide.

In a tenth aspect, there is provided an apparatus for producing steam for use in stimulating a geologic formation, the apparatus including a catalyst that includes a plurality of bodies including an active metal oxide, and wherein at least a portion of the plurality of bodies are provided in a spherical configuration; a liquid hydrogen peroxide source, wherein the liquid hydrogen peroxide source includes liquid hydrogen peroxide having a strength between about 30 and about 70 weight percent; a first coupling configured to provide a first fluid communication pathway between the liquid hydrogen peroxide source and the catalyst; and a second coupling configured to provide a second fluid communication pathway between the catalyst and a geologic formation.

In some embodiments, the active metal oxide includes an alkaline-promoted manganese oxide.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
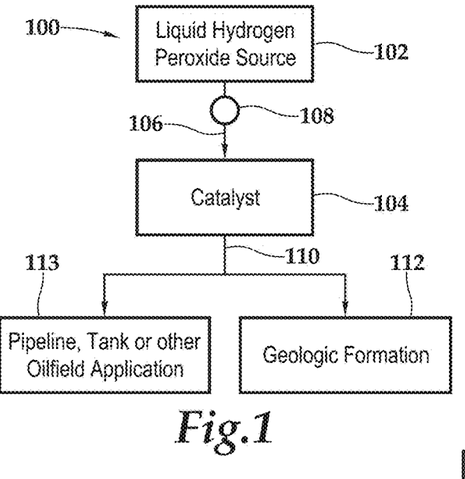
FIG. 1 is a block diagram illustrating an embodiment of an apparatus for producing steam for use in oilfield applications, such as, but not limited to, stimulating a geologic formation to increase oil production, clearing obstructed pipelines or tanks, heating hydrogen peroxide or other fluids, or heating living quarters at a well site or elsewhere, in accordance with this disclosure.

Referring to FIG. 1, an embodiment of an apparatus 100 for producing steam for use in oilfield applications, such as, for example, stimulating a geologic formation 112 to increase oil production, is shown. The apparatus 100 includes a liquid hydrogen peroxide source 102, a catalyst 104, a first conduit 106 connecting the liquid hydrogen peroxide source 102 to the catalyst 104, a pump 108 for moving the liquid hydrogen peroxide from the liquid hydrogen peroxide source 102 to the catalyst 104, and a second conduit 110 connecting the catalyst 104 to a geologic formation 112 and/or a pipeline, tank or other oilfield application 113. As described in more detail below, the apparatus 100 can be used with moderate strength hydrogen peroxide that is less dangerous to store, transport, and handle, and is less expensive to purchase. In addition, the apparatus 100 includes a catalyst 104 that may include a porous ceramic substrate that is less expensive to manufacture and avoids many of the problems associated with prior catalysts, such as flooding and premature poisoning of the catalyst, as will be described in more detail below. The steam produced by the apparatus 100 can be used in several oil field applications, such as but not limited to, enhanced oil recovery, equipment cleaning, heating hydrogen peroxide or other liquids, heating living quarters at an oilfield location, or other uses.

It was previously believed that using moderate strength liquid hydrogen peroxide was unsuitable to produce steam, and may cause flooding of the catalyst and/or cause a high deactivation or poisoning rate of the catalyst. It was also thought that stabilizers in moderate strength hydrogen peroxide would adhere to the catalyst within a short period of time to "poison" or deactivate the catalyst. However, it has been unexpectedly found that the catalyst of the present disclosure does not flood when contacted with moderate strength hydrogen peroxide for long periods of time and it has been found that the deactivation rate or poisoning rate of the present catalyst when contacted with moderate strength hydrogen peroxide for long periods of time is greatly reduced, as will be described in more detail below.

Referring again to FIG. 1, the liquid hydrogen peroxide source 102 includes moderate strength liquid hydrogen peroxide and may be any suitable source, such as, for example, a mobile container of liquid hydrogen peroxide. In some embodiments, the liquid hydrogen peroxide source 102 contains liquid hydrogen peroxide that has a strength of between about 30 and about 70 weight percent. In some embodiments, the liquid hydrogen peroxide source 102 contains liquid hydrogen peroxide that has a strength between about 50 and about 65 weight percent. In other embodiments, the liquid hydrogen peroxide source 102 contains liquid hydrogen peroxide that has a strength of about 60 weight percent. In some embodiments, the liquid hydrogen peroxide source 102 contains liquid hydrogen peroxide that has a strength below the self-heat strength of the liquid hydrogen peroxide (about 64.7 weight percent). In some embodiments, the liquid hydrogen peroxide is mixed with water, one or more stabilizers that may be added by the manufacturer of the hydrogen peroxide, and/or a mixture of other elements to create the above-described weight percents. In some embodiments, the stabilizer includes one or more phosphoric acids, phosphonic acids, inorganic stannates such as sodium stannate, other similar substances, or additives.

As illustrated in the embodiment of FIG. 1, the liquid hydrogen peroxide source 102 is coupled to the catalyst 104 by the first conduit 106 to deliver liquid hydrogen peroxide to the catalyst 104 at a predetermined rate. In some embodiments, the rate at which the liquid hydrogen peroxide is delivered to the catalyst 104 through the first conduit 106 is variable and is controlled by the pump 108. In some embodiments, the first conduit 106 also includes one or more valves (not shown), flow meters (not shown), or other mechanisms to measure and/or control the flow rate of liquid hydrogen peroxide from the liquid hydrogen peroxide source 102 to the catalyst 104. The first conduit 106 may be any suitable pathway or coupling mechanism to transport the liquid hydrogen peroxide from the liquid hydrogen peroxide source 102 to the catalyst 104, such as, for example, a pipe, hose or chamber. In some embodiments, the liquid hydrogen peroxide source 102, the pump 108 and the catalyst 104 are located remotely from the geologic formation 112, as shown in FIG. 1, to reduce the possibility that liquid hydrogen peroxide solution will enter the geologic formation 112. Thus, in some embodiments, the catalyst 104 is not located within the geologic formation 112 but is located adjacent to or a specified distance from the geologic formation 112. As such, in some embodiments, the liquid hydrogen peroxide solution is not pumped into the geologic formation 112 but rather is reacted to form steam at the catalyst 104, which is located remotely from the geologic formation 112.

In some embodiments, the catalyst 104 includes a plurality of ceramic bodies. In some embodiments, the ceramic bodies include spheres of various diameters. In some embodiments, the ceramic bodies are packed within a container such that space between larger spheres is at least partially filled with smaller spheres. In some embodiments, smaller spheres fit between larger spheres such that a majority of the volume holding the catalyst 104 is filled by the ceramic bodies. In some embodiments, the spheres have a diameter between about 0.0625 inches and about 0.25 inches. In some embodiments, the maximum sphere packing is obtained by a defined trimodal distribution of spheres. In some embodiments, the trimodal distribution is about 45 percent, 35 percent and 20 percent by volume for activated alumina spheres of 0.25 inches in diameter, 0.125 inches in diameter and 0.0625 inches in diameter, respectively. In some embodiments, the sphere packing is obtained by a defined bimodal distribution of spheres. In some embodiments, the bimodal distribution is about 45 percent by volume of 0.25 inch diameter spheres and 55 percent by volume of 0.125 inch diameter spheres. Thus, in some embodiments, the spheres have three distinct diameters (trimodal distribution), in other embodiments the spheres have two distinct diameters (bimodal distribution), while in other embodiments the spheres have four or more distinct diameters. In other embodiments, the catalyst 104 includes spheres having one diameter. In other embodiments, the catalyst 104 includes spheres having more than 3 distinct diameters. In other embodiments, the ceramic bodies include other shapes, such as, for example, a square shape, a rectangular shape or a triangular shape. In other embodiments, the ceramic bodies may be any other suitable shape and may be closely packed chunks, extrudate, pieces, pellets or a combination thereof. In some embodiments, the ceramic bodies are closely packed into a container (not shown).

The ceramic bodies of the catalyst 104 may be made of any suitable ceramic material. For example, in some embodiments, the ceramic bodies are made of one or more of alumina, silica, silica alumina or another alumino-silicate, zirconia, activated carbon or other ceramic refractory oxide. In other embodiments, ceramic bodies also include zeolite molecular sieves or other shape selective ceramics. In some embodiments, the ceramic bodies are made of a combination of ceramic materials. In some embodiments, the ceramic bodies are porous and thus have internal and external surface areas. In other embodiments, the ceramic bodies are not porous. In alternate embodiments, the catalyst does not include a plurality of bodies but instead includes a single body, such as a porous monolith or honeycomb body, that at least partially fills a catalyst container. In some embodiments, the ceramic bodies are activated in that they have a high surface area, beyond the expected exterior surface area. In some embodiments, the internal surface area contributes greatly to the abstraction of the catalyst in formation, and the usefulness (activity) of the dispersed catalyst in use.

In some embodiments, the ceramic bodies of the catalyst 104 are impregnated with an alkaline-promoted manganese oxide, alkaline-promoted manganese dioxide or other catalytic agent. As described below, in some embodiments, the ceramic bodies are impregnated by soaking the ceramic bodes in the catalytic agent for a period of time. In embodiments in which the ceramic bodies are porous or otherwise include an internal and an external surface area, the internal and external surface areas of the ceramic bodies are impregnated as the ceramic bodies soak in the catalytic agent. In some embodiments, the catalytic agent includes at least one cation that has a defined valence state, the cation species being either Mn, Ag, Ru, Pb, V, Cr or Co or other transition metals or noble metals, such as Cu or Pt. In some embodiments, the catalytic agent includes an alkaline promoted cation species, such as, but not limited to, those described above. An embodiment of a process of manufacturing the catalyst 104 is described in more detail below in conjunction with FIG. 3. In some embodiments, the catalytic agent includes one or more of sodium permanganate and sodium manganate. In other embodiments, the catalytic agent includes sodium hydroxide and potassium hydroxide that are then calcined to form an alkaline-promoted manganese oxide (or dioxide). Typical manganese compounds with fugitive anions are manganese nitrate, manganese acetate and the like.

In another embodiment, the catalyst 104 includes a plurality of bodies formed of an active ceramic oxide in a consolidated state without an underlying ceramic body. For example, in some embodiments a cation species such as Mn, Ag, Ru, Pb, V, Cr, or Co, or other transition metal or noble metal such as Cu or Pt, is used as an active ceramic oxide by itself in a consolidated fashion to form a plurality of bodies. In some embodiments, the bodies are spheres of various diameters. In some embodiments, the bodies are packed within a container such that space between larger spheres is at least partially filled with smaller spheres. In some embodiments, smaller spheres fit between larger spheres such that a majority of the volume of the catalyst 104 is filled by the bodies. In some embodiments, the spheres have a diameter between about 0.0625 inches and about 0.25 inches. In some embodiments, the maximum sphere packing is obtained by a defined trimodal distribution of spheres. In some embodiments, the trimodal distribution is 45 percent, 35 percent and 20 percent by volume for spheres of 0.25 inches in diameter, 0.125 inches in diameter and 0.0625 inches in diameter, respectively. In some embodiments, the sphere packing is obtained by a defined bimodal distribution of spheres. In some embodiments, the bimodal distribution is 45 percent by volume of 0.25 inch diameter spheres and 55 percent by volume of 0.125 inch diameter spheres. Thus, in some embodiments, the spheres have three distinct diameters (trimodal distribution) while in other embodiments the spheres have two distinct diameters (bimodal distribution). In other embodiments, the catalyst 104 includes spheres having one diameter. In other embodiments, the catalyst 104 includes spheres having more than 3 distinct diameters. In other embodiments, the ceramic bodies have other shapes, such as, for example, a square shape, a rectangular shape or a triangular shape. In other embodiments, the bodies may by any other suitable shape and may be closely packed chunks, extrudate, pieces, pellets or a combination thereof. In some embodiments, the bodies are closely packed into a container (not shown). In alternate embodiments, the catalyst does not include a plurality of bodies but instead includes a single body that includes an active ceramic oxide by itself, in a consolidated fashion.

In still other embodiments, the catalyst 104 may include a metal oxide body, such as an active metal oxide body. In such embodiments, the metal oxide body may be formed or configured into any desirable shape, such as one or more of the shapes described herein in connection with the shape of the ceramic bodies.

In some embodiments, the steam produced by the interaction of the catalyst 104 and the hydrogen peroxide has a pressure up to about 1,500 psi. In other embodiments, the steam produced by the interaction of the catalyst 104 and the hydrogen peroxide has a pressure up to about 3,000 psi. It is projected that higher pressures will be achievable as equipment to transport and otherwise use the steam is improved.

Referring again to FIG. 1, in some embodiments a second conduit 110 couples the catalyst 104 to a geologic formation 112 or a steam applicator for clearing obstructions from pipelines, tanks or other oil and gas equipment 113. The second conduit 110 may be any suitable mechanism for transporting steam produced by the interaction of the liquid hydrogen peroxide and the catalyst 104, such as, for example, a tube, hose or chamber. For example, the geologic formation 112 may include production tubing and the second conduit 110 may couple the catalyst 104 to the production tubing. In some embodiments, the second conduit 110 transports steam from the catalyst 104 to another location, such as, for example, a steam applicator for cleaning oilfield equipment 113, a heat exchanger for heating the hydrogen peroxide or other liquids, a heat exchanger for heating living quarters at an oilfield location, or any other suitable location. As discussed above, the steam produced by the apparatus 100 can be used in several oilfield applications and is not limited to the specific applications described herein. In some embodiments, for example, the steam travels through the second conduit 110 to an applicator for clearing obstacles from pipelines, tanks or other oilfield equipment. In some embodiments, the second conduit 110 is of sufficient length to allow for the hydrogen peroxide source 102 and the catalyst 104 to be remotely positioned from the geologic formation 112 to reduce the chance that unreacted hydrogen peroxide will pass into the geologic formation 112.

Figure 2:
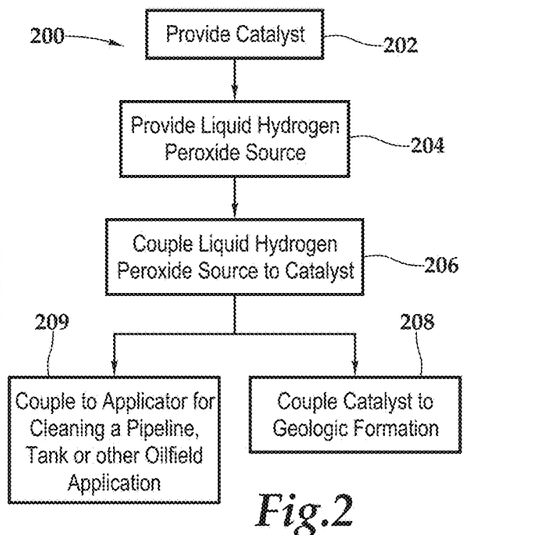
FIG. 2 is a block diagram illustrating an embodiment of a method of manufacturing an apparatus for producing steam for use in oilfield applications, such as, but not limited to, stimulating a geologic formation to increase oil production, clearing obstructed pipelines or tanks, heating hydrogen peroxide or other fluids, or heating living quarters at a well site, in accordance with this disclosure.

FIG. 2 is a block diagram illustrating a method 200 of manufacturing an apparatus 100 for producing steam for use in an oilfield application. In some embodiments, the method 200 begins and a catalyst 104 is provided, as shown at block 202. As described above, in some embodiments the catalyst 104 includes a plurality of ceramic bodies that are impregnated with a catalyst agent, such as an alkaline-promoted manganese oxide or an active metal oxide. As described above, in some embodiments the ceramic bodies may be impregnated with other elements or a combination of elements. In other embodiments, the catalyst includes one or more bodies that are formed of an active ceramic oxide by itself, as described above. In some embodiments, the ceramic bodies (or bodies formed of an active ceramic oxide by itself) are placed or packed in a container that permits entry of liquid hydrogen peroxide and permits the release of steam produced by the decomposition of the liquid hydrogen peroxide as it contacts the catalyst 104. A liquid hydrogen peroxide source 102 is also provided, as shown at block 204, and is coupled to the catalyst 104, for example, by a first conduit 106, as shown at block 206. In some embodiments, the catalyst 104 is then coupled to a geologic formation 112 and/or to an applicator for cleaning a pipeline, tank or other oilfield application by a second conduit 110, as shown at blocks 208 and 209. As described above, the catalyst may also be coupled to other oilfield applications, such as heat exchangers to heat the hydrogen peroxide or other liquids or heat exchangers to heat living quarters at an oilfield location. As described above, the catalyst 104 may be contained within a container that is coupled to the first and second conduits 106 and 110 and may be located remotely from the geologic formation 112.

Figure 3:
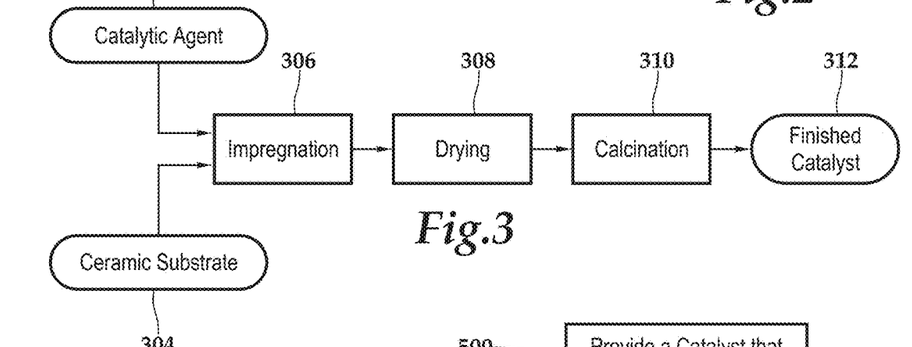
FIG. 3 is a block diagram illustrating an embodiment of a method of manufacturing a catalyst for use in creating steam in accordance with this disclosure.

FIG. 3 is a block diagram illustrating an embodiment of a method 300 of manufacturing a catalyst 104 for producing steam. The catalyst 104 produced using the illustrated method may be similar to the catalyst described in U.S. Pat. No. 6,991,772, entitled "$H_2O_2$ Decomposition Catalyst" to the present inventor, which is hereby incorporated by reference in its entirety for all purposes. The method 300 begins and a catalytic agent is provided, as shown at block 302, and a ceramic substrate is provided, as shown at block 304. As described above, the catalytic agent may include any suitable catalytic substance, such as alkaline-promoted manganese oxide, alkaline-promoted manganese dioxide, or a combination of catalyst substances. As described above, the ceramic substrate may include a plurality of porous ceramic bodies. In some embodiments, a high surface area, porous ceramic substrate in the form of a single monolith or honeycomb is selected to form the ceramic substrate. In other embodiments, a high surface area, porous ceramic substrate in the form of a plurality of closely packed chunks, extrudate, pieces, pellets, spheres or a combination thereof, is selected to form the ceramic substrate.

As shown at block 306, the ceramic substrate is impregnated with the catalytic agent. In some embodiments, a soluble salt of a desired catalyst cation is mixed into a solvent therefor, the cation species being either Mn, Ag, Ru, Pb, V, Cr or Co or other transition metals or noble metals, such as Cu or Pt. In some embodiments, a catalytic agent in solution is poured over the ceramic substrate in an amount sufficient to soak the ceramic substrate and impregnate it through the pores thereof with the catalytic agent. The ceramic substrate is soaked in the catalytic agent for a period of time to impregnate the ceramic substrate. In some embodiments, the ceramic substrate is soaked in the catalytic agent for less than about 1 hour. In some embodiments, the substrate is soaked in the catalytic agent for about 15 minutes. In some embodiments, a catalyst cation loading is calculated based on a defined percentage of the final cationic species. As an example, a loading may include 1% w/w of manganese (+4) on a zeolite molecular sieve (ZMS) substrate. The calculated amount of catalytic agent is then added to the catalyst solution as described above.

In some embodiments, a catalytic (or ionic) promoter can be added to the catalyst solution. In some embodiments, catalytic (or ionic) promoters are chosen from Group I and Group II of the Periodic Table of the Elements, such as sodium (Na+), potassium (K+), the ammonium ion (NH4+), lithium (Li+), calcium (Ca++), strontium (Sr++) and barium (Ba++).

As shown at block 308, the impregnated ceramic substrate is then dried to remove the solvent of the catalyst solution. In some embodiments, the ceramic substrate is dried in an oven that is at about 150 degrees Celsius. In some embodiments, the ceramic substrate is dried for between about 60 and about 120 minutes. In other embodiments, the impregnated material is dried until constant weight or no visible moisture is given off.

As shown at block 310, the impregnated, dried substrate is then calcined to form an activated bulk catalyst. In some embodiments, the substrate is calcined by placing the impregnated substrate in an oven at between about 200 and about 500 degrees Celsius for between about 0.5 to about 24 hours. In some embodiments, the manganese-based material is calcined until it forms a uniform brown to black color depending on catalyst loading. In some embodiments, the initial color of the catalyst is a shade of purple.

As shown at block 312, the catalyst 104 is then finished. In some embodiments, the catalyst 104 is placed in a container that includes an inlet to receive liquid hydrogen peroxide and an outlet to release steam, as described above. In some embodiments, the catalyst 104 is packed into the container to reduce or eliminate movement of the catalyst components during reaction with the liquid hydrogen peroxide.

In another embodiment, a method for providing a steam producing apparatus begins and a catalytic agent is provided. As described above, the catalytic agent may include any suitable catalytic substance, such as alkaline-promoted manganese oxide, alkaline-promoted manganese dioxide, or a combination of catalyst substances. The catalytic agent may be in a consolidated state that can be formed into a plurality of bodies that may have any suitable shape, such as generally spherical shapes. The ceramic bodies may then be dried in an oven and may be calcined to form an activated bulk catalyst. In some embodiments, the bodies are then placed in a container that includes an inlet to receive liquid hydrogen peroxide and an outlet to release steam, as described above. In some embodiments, the bodies are packed into the container to reduce or eliminate movement of the bodies during reaction with the liquid hydrogen peroxide.

Figure 4:
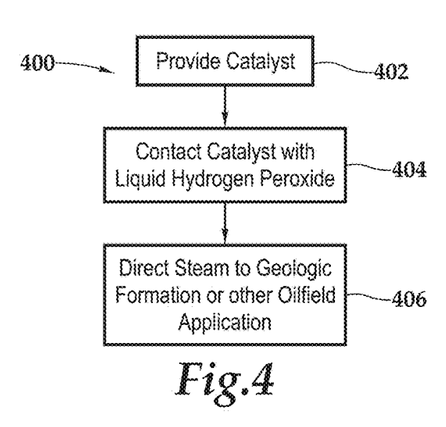
FIG. 4 is a block diagram illustrating an embodiment of a method for producing steam for use in oilfield applications, such as, but not limited to, stimulating a geologic formation to increase oil production, clearing obstructed pipelines or tanks, heating hydrogen peroxide or other fluids, or heating living quarters at a well site, in accordance with this disclosure.

FIG. 4 is a block diagram illustrating a method 400 for producing steam for use in stimulating a geologic formation 112 to increase oil production, for use in cleaning or clearing a pipeline, tank or other oilfield equipment, or for use in another oilfield application, such as, but not limited to, heating the hydrogen peroxide or heating living quarters at an oilfield location. In some embodiments, the method 400 includes providing a catalyst 104 that includes a plurality of ceramic bodies impregnated with an alkaline-promoted manganese oxide or a plurality of bodies that are made essentially of an active ceramic oxide, as shown at block 402. In some embodiments, the catalyst 104 is contacted with a moderate strength liquid hydrogen peroxide to produce steam, as shown at block 404. In some embodiments, the liquid hydrogen peroxide has a strength between about 30 and about 70 percent. Steam is produced as the hydrogen peroxide contacts the catalyst and decomposes to produce steam and oxygen. It was previously believed that using moderate strength liquid hydrogen peroxide to produce steam with a catalyst including a pourous ceramic substrate would cause flooding of the catalyst and/or cause a high deactivation or poisoning rate of the catalyst. For example, it was thought that absorbent ceramics, such as those described herein, used to react with moderate strength hydrogen peroxide below the self-heat strength of the hydrogen peroxide would flood the catalyst. It was also thought that stabilizers in moderate strength hydrogen peroxide would adhere to the catalyst within a short period of time to poison or deactivate the catalyst. However, it has been found that the catalyst 104 of the present disclosure, although porous and absorbent, does not flood when contacted with moderate strength hydrogen peroxide for long periods of time because the decomposition mechanism is on the same order of timing as the adsorption/desorption mechanism. In addition, it has been found that the deactivation rate or poisoning rate of the catalyst 104 when contacted with moderate strength hydrogen peroxide for long periods of time is greatly reduced due to the fact that non-metallic catalysts do not form insoluble phosphates on the active catalyst surfaces. In some embodiments, the catalyst 104 produces steam for periods of time much longer than solid, precious metal catalysts or liquid catalysts, which typically have a useful life of a few minutes for most rocket applications and consume significantly more high strength hydrogen peroxide per unit time. Test data showing steam production for long periods of time is described in more detail below in connection with FIGS. 5-8B. While the test data discussed below shows steam production for specified periods of time (54 hours in FIGS. 5 and 6 and 91 hours in FIGS. 7-8B), it is anticipated that production can last for longer periods of time without deactivation or flooding of the catalyst.

Referring again to FIG. 4, the steam is then directed to a geologic formation 112 to, in one embodiment, increase oil production from the geologic formation 112 or is directed to another oilfield application, such as an application for clearing obstructions from a pipeline or tank, as shown at block 406. For example, the steam may be directed to the production tubing of a geologic formation 112. As discussed above, the steam may be directed to other locations in other embodiments. For example, in some embodiments the steam is directed to a steam applicator for cleaning oilfield equipment, a heat exchanger for heating the hydrogen peroxide or other liquids, or a heat exchanger for heating living quarters at an oilfield location.

Figure 5:
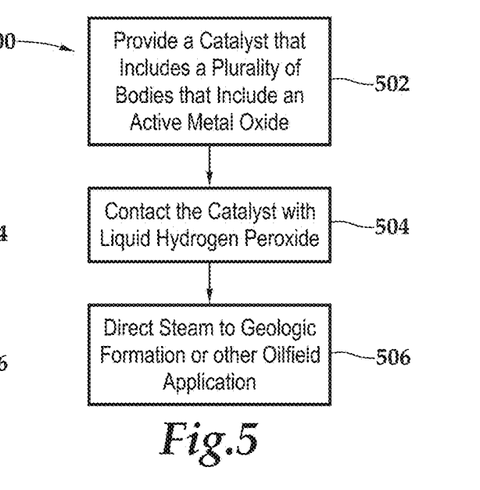
FIG. 5 is a block diagram illustrating an embodiment of a method for producing steam for use in oilfield applications, such as, but not limited to, stimulating a geologic formation to increase oil production, clearing obstructed pipelines or tanks, heating hydrogen peroxide or other fluids, or heating living quarters at a well site, in accordance with this disclosure.

FIG. 5 is a block diagram illustrating a method 500 for producing steam for use in stimulating a geologic formation 112 to increase oil production, for use in cleaning or clearing a pipeline, tank or other oilfield equipment, or for use in another oilfield application, such as, but not limited to, heating the hydrogen peroxide or heating living quarters at an oilfield location. In some embodiments, the method 500 includes providing a catalyst 104 that includes a plurality of bodies that include an active metal oxide, as shown at block 502. In some embodiments, the bodies are formed by molding an active metal oxide in a constituted state into a plurality of spherical shapes, or in one or more shapes previously described in connection with ceramic bodies. In some embodiments, the active metal oxide includes manganese dioxide or an alkaline-promoted manganese oxide.

In some embodiments, the catalyst 104 is contacted with a moderate strength liquid hydrogen peroxide to produce steam, as shown at block 504. In some embodiments, the liquid hydrogen peroxide has a strength between about 30 and about 70 percent, between about 50 and about 65 weight percent, or about 60 weight percent. In some embodiments, the liquid hydrogen peroxide has a strength below a self-heating strength of the liquid hydrogen peroxide. Steam is produced as the hydrogen peroxide contacts the catalyst and decomposes to produce steam and oxygen. The steam is then directed to a geologic formation 112 to increase oil production from the geologic formation 112 or is directed to another oilfield application, such as an application for clearing obstructions from a pipeline or tank, as shown at block 506. For example, the steam may be directed to the production tubing in communication with or connected to a geologic formation 112. As discussed above, the steam may be directed to other locations in other embodiments. For example, in some embodiments the steam is directed to a steam applicator for cleaning oilfield equipment, a heat exchanger for heating the hydrogen peroxide or other liquids, or a heat exchanger for heating living quarters at an oilfield location.

Figure 6:
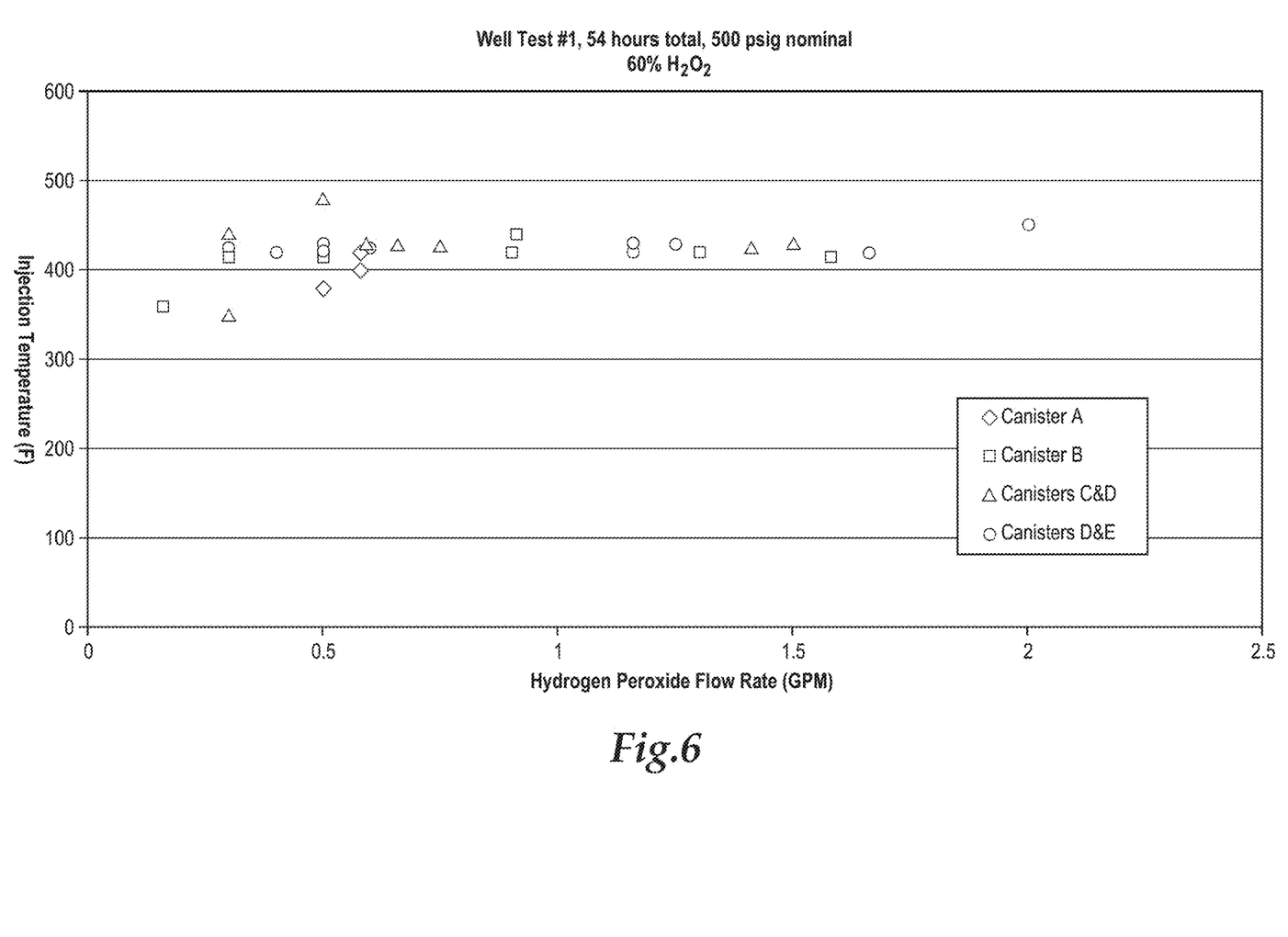
FIG. 6 is a chart showing injection temperature and hydrogen peroxide flow rate for an embodiment of an apparatus for producing steam using 60% $H_2O_2$, in accordance with this disclosure.
Figure 7:
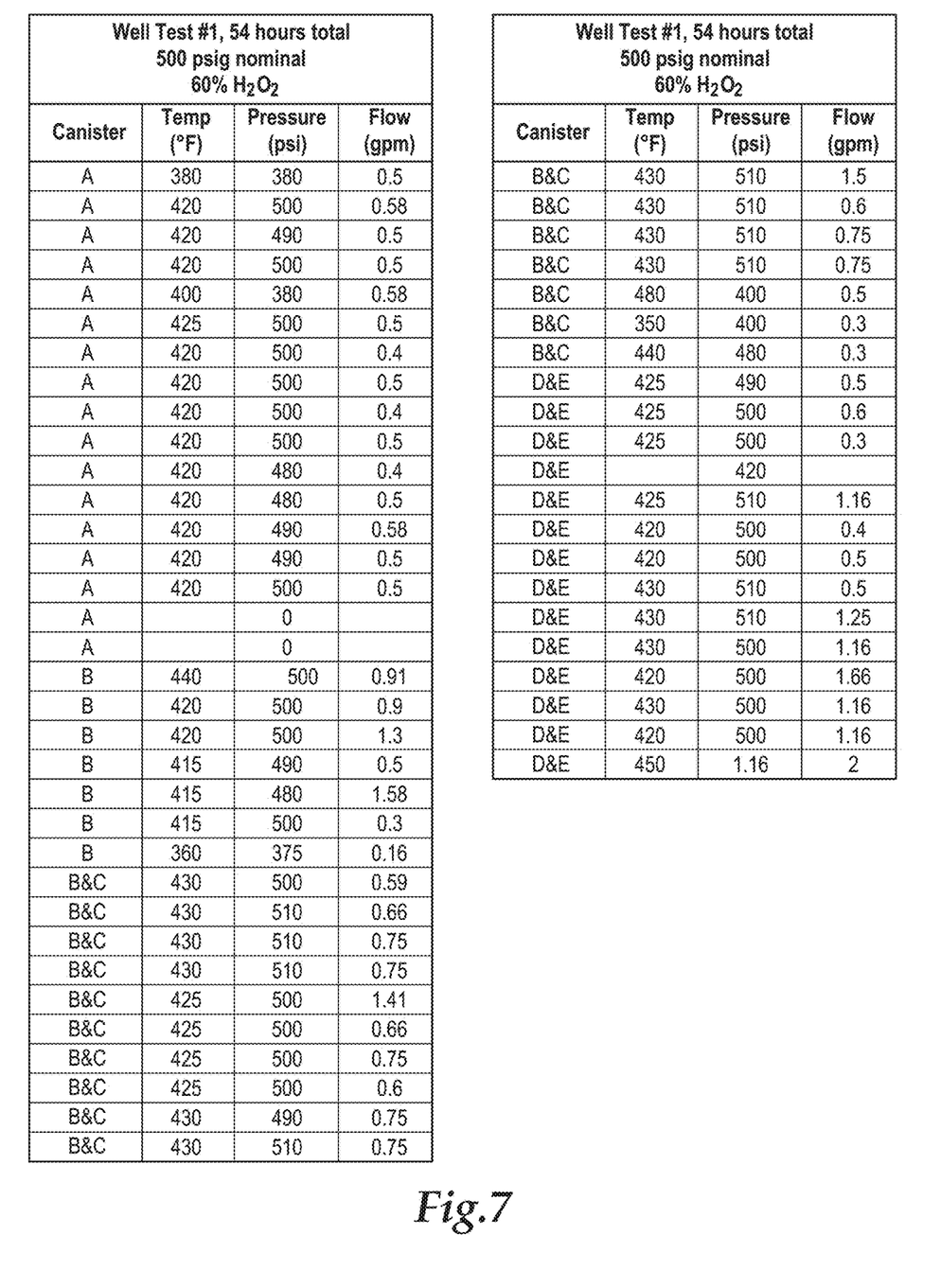
FIG. 7 is a table showing data illustrated in the chart of FIG. 6.

FIG. 6 is a chart showing injection temperature and hydrogen peroxide flow rate for a test of an embodiment of an apparatus for producing steam using 60 weight percent hydrogen peroxide. FIG. 7 is a table showing data illustrated in the chart of FIG. 6. In the tests, the catalyst included spherical ceramic bodies impregnated with alkaline promoted manganese dioxide. As shown in FIGS. 6 and 7, the steam produced by the apparatus had a temperature of approximately 400 degrees Fahrenheit with flow rates ranging from 0 gallons per minute (GPM) to about 2.5 GPM. The catalyst remained active during the 54 hour testing period and did not flood or poison. It is expected that the catalyst would have remained active without flooding or poisoning for a longer period of time than the testing period. As such, the significant plateau of catalyst activity and system performance is of great merit as applied to a variety of oil field conditions.

Figure 8:
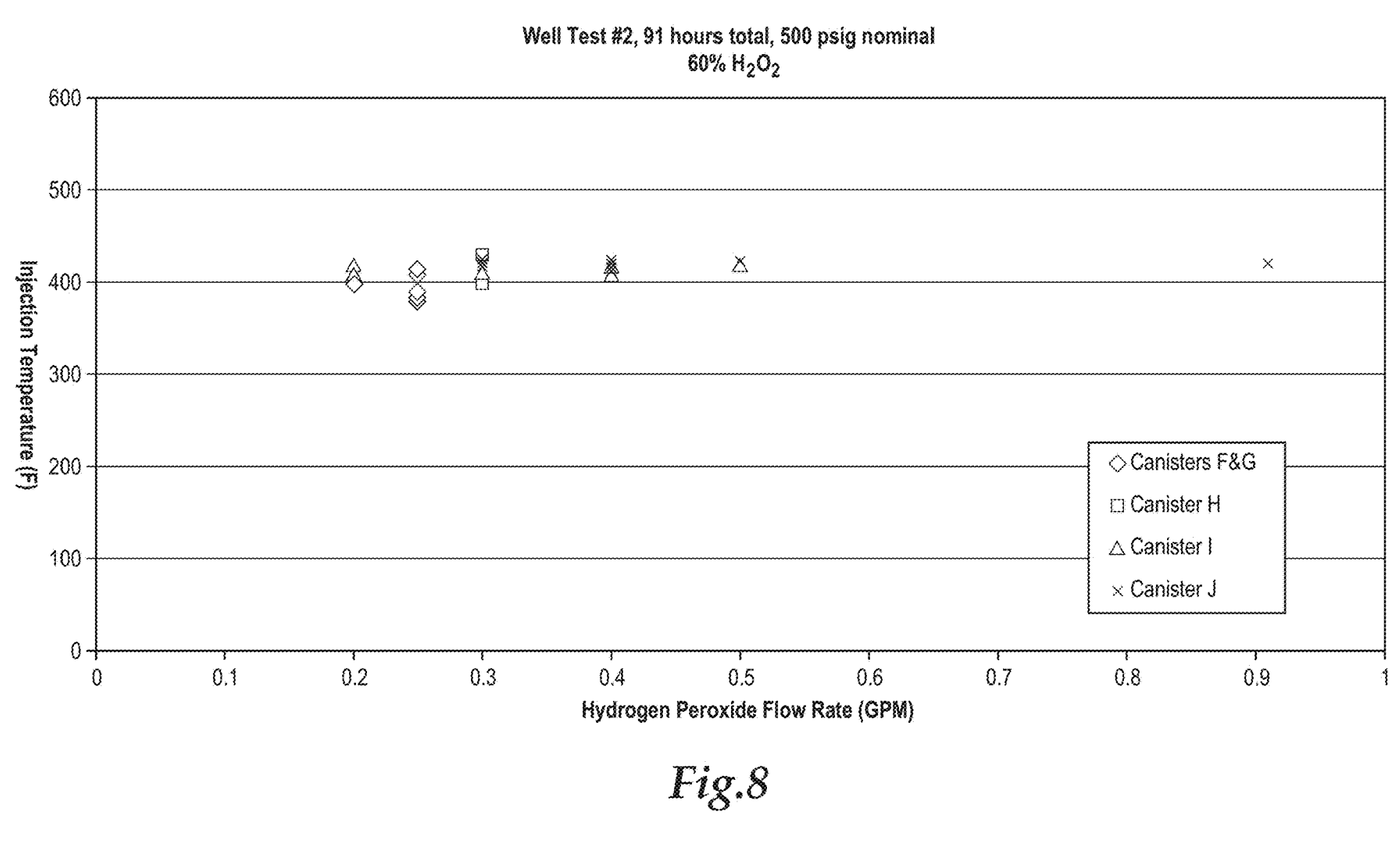
FIG. 8 is a chart showing injection temperature and hydrogen peroxide flow rate for an embodiment of an apparatus for producing steam using 60% $H_2O_2$, in accordance with this disclosure.
Figure 9A:
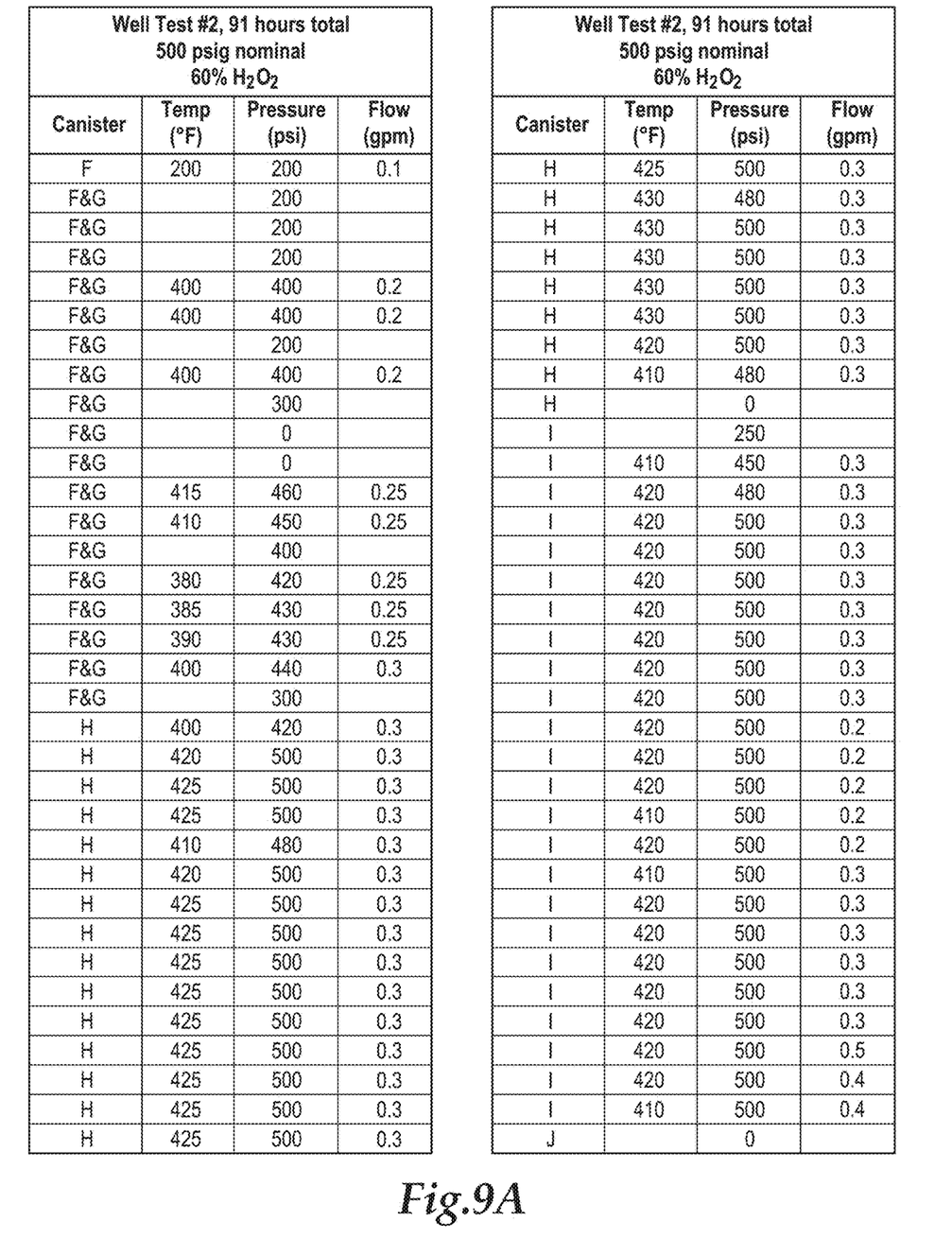
FIGS. 9A and 9B are tables showing data illustrated in the chart of FIG. 8.
Figure 9B:
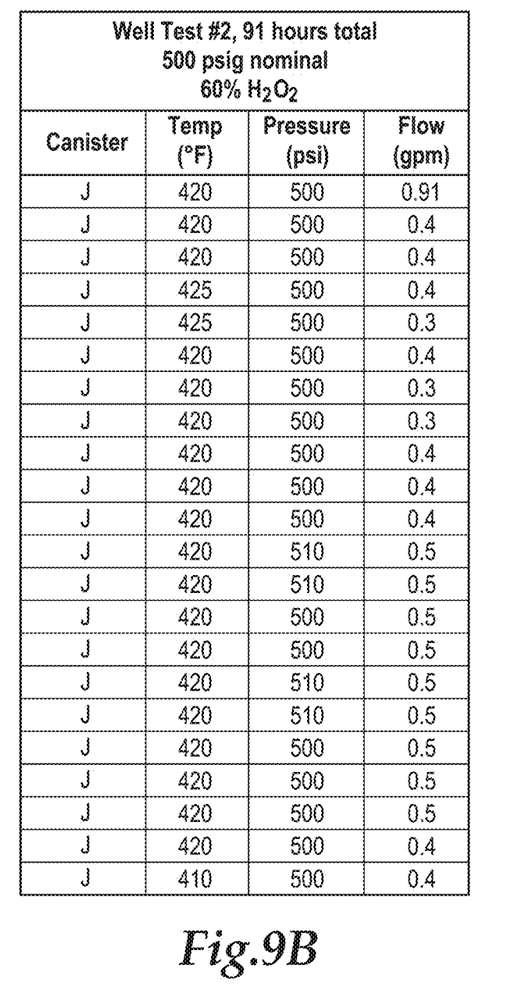

FIG. 8 is a chart showing injection temperature and hydrogen peroxide flow rate for a second test of an embodiment of an apparatus for producing steam using 60 weight percent hydrogen peroxide. FIGS. 9A and 9B are tables showing data illustrated in the chart of FIG. 8. As shown in FIGS. 8, 9A and 9B, the steam produced by the apparatus has a temperature of approximately 400 degrees Fahrenheit with flow rates ranging from 0 GPM to about 1 GPM. The catalyst remained active during the 91 hour testing period and did not flood or poison. It is expected that the catalyst would have remained active without flooding or poisoning for a longer period of time than the testing period. As such, the significant plateau of catalyst activity and system performance is of great merit as applied to a variety of oil field conditions.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In this specification, the word "comprising" and "include" or "including" are to be understood in their "open" sense, that is, in the sense of "including at least", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method for producing steam generated primarily by decomposition of a liquid hydrogen peroxide solution, the steam being produced for use in stimulating a geologic formation from a location not located within the geologic formation, the method comprising:
   providing, at the location not located within the geologic formation, a plurality of bodies that consist essentially of manganese dioxide for decomposing the liquid hydrogen peroxide solution, wherein the liquid hydrogen peroxide solution is decomposed primarily in response to exposure to the manganese dioxide;
   contacting the plurality of bodies that consist essentially of manganese dioxide with the liquid hydrogen peroxide solution at the location not located within the geologic formation to decompose the liquid hydrogen peroxide solution into oxygen and steam and produce the steam at the plurality of bodies not located within the geologic formation, wherein the steam is produced primarily by the decomposition of the liquid hydrogen peroxide solution into oxygen and steam and not primarily by combustion, the liquid hydrogen peroxide solution having a concentration below a self-heat concentration of the liquid hydrogen peroxide solution and less than about 64.7 weight percent and greater than 30 weight percent; and
   injecting the steam from the location not located within the geologic formation into the geologic formation.

2. The method of claim 1, wherein the steam has a pressure in a range extending from 0 psi up to about 1,500 psi.

3. The method of claim 1, wherein the liquid hydrogen peroxide solution is applied to the catalyst for at least a day.

4. The method of claim 1, further wherein the steam is further provided for cleaning at least one of production tubing, pipelines, and tanks.

5. An apparatus for producing steam generated primarily by decomposition of a liquid hydrogen peroxide solution, wherein the steam is produced for use in stimulating a geologic formation from a location not located within the geologic formation, the apparatus comprising:
   a catalyst consisting of a plurality of bodies consisting essentially of manganese dioxide and not located within the geologic formation and for decomposing the liquid hydrogen peroxide solution into oxygen and steam primarily in response to contact with the manganese dioxide to produce the steam at the catalyst not located within the geologic formation, wherein the steam is produced primarily by the decomposition of the liquid hydrogen peroxide solution into oxygen and steam in response to contact with the manganese dioxide and not primarily by combustion;
   a liquid hydrogen peroxide source, wherein the liquid hydrogen peroxide source is positioned at the location not located within the geologic formation and configured to contain the liquid hydrogen peroxide solution, the liquid hydrogen peroxide solution having a concentration below a self-heat concentration of the liquid hydrogen peroxide solution and less than about 64.7 weight percent and greater than 30 weight percent, the liquid hydrogen peroxide solution not substantially entering the geological formation;
   a first coupling configured to provide a first fluid communication pathway between the liquid hydrogen peroxide source and the catalyst; and
   a second coupling configured to provide a second fluid communication pathway between the catalyst and the geologic formation, wherein the second fluid communication pathway communicates steam to the geologic formation.

6. The apparatus of claim 5, wherein the liquid hydrogen peroxide solution further comprises one or more stabilizers.

7. The apparatus of claim 5, wherein the liquid hydrogen peroxide solution is applied to the catalyst for at least a day.

8. The apparatus of claim 5, wherein the apparatus is further provided for producing steam for cleaning at least one of production tubing, pipelines, and tanks.

9. A method for producing steam generated primarily by decomposition of a liquid hydrogen peroxide solution into oxygen and steam, the steam being produced for use in stimulating a geologic formation from a location adjacent the geologic formation, the method comprising:

providing, at the location adjacent the geologic formation, a catalyst consisting of manganese dioxide for decomposing the liquid hydrogen peroxide solution into oxygen and steam outside of the geologic formation;

contacting, at the location adjacent the geologic formation, the catalyst with the liquid hydrogen peroxide solution to decompose the liquid hydrogen peroxide solution into oxygen and steam and produce the steam, wherein the steam is produced primarily by the decomposition of the liquid hydrogen peroxide solution into oxygen and steam and not primarily by combustion, the liquid hydrogen peroxide solution having a concentration below a self-heat concentration of the liquid hydrogen peroxide solution and less than about 64.7 weight percent and greater than 30 weight percent; and injecting the steam from outside the geologic formation into the geologic formation.

10. The method of claim 9, wherein the liquid hydrogen peroxide solution further comprises one or more stabilizers.

11. The method of claim 9, wherein the catalyst is contacted by the liquid hydrogen peroxide solution for at least a day.

12. An apparatus for producing steam generated primarily by decomposition of a liquid hydrogen peroxide solution into oxygen and steam, wherein the steam is produced for use in stimulating a geologic formation from a location not located within the geologic formation, the apparatus comprising:

a catalyst that has a plurality of bodies consisting essentially of manganese dioxide not located within the geologic formation and for decomposing the liquid hydrogen peroxide solution into oxygen and steam to produce the steam at the catalyst not located within the geologic formation, wherein the steam is produced primarily by the decomposition of the liquid hydrogen peroxide solution into oxygen and steam at the location not located within the geologic formation and not primarily by combustion, a liquid hydrogen peroxide source, wherein the liquid hydrogen peroxide source is at the location not located within the geologic formation and configured to contain the liquid hydrogen peroxide solution, the liquid hydrogen peroxide solution having a concentration below a self-heat concentration of the liquid hydrogen peroxide solution and less than about 64.7 weight percent and greater than 30 weight percent;

a first coupling configured to provide a first fluid communication pathway between the liquid hydrogen peroxide source and the catalyst; and a second coupling configured to provide a second fluid communication pathway between the catalyst and the geologic formation, wherein the second fluid communication pathway communicates steam from the liquid hydrogen peroxide source configured to contain the liquid hydrogen peroxide at the location not located within the geologic formation away from the liquid hydrogen peroxide source and to the geologic formation.

13. The apparatus of claim 12, wherein the active metal oxide is an alkaline-promoted manganese oxide.

14. The apparatus of claim 12, wherein the liquid hydrogen peroxide solution is applied to the catalyst for at least a day.

15. The method of claim 12, wherein the active metal oxide is manganese dioxide.

16. A method for producing steam primarily by decomposition of a liquid hydrogen peroxide solution into oxygen and steam, the method comprising:

providing, a catalyst consisting essentially of manganese dioxide for decomposing the liquid hydrogen peroxide solution into oxygen and steam, wherein the liquid hydrogen peroxide solution is decomposed primarily in response to exposure to the manganese dioxide, conducting, by a first coupling comprising a first fluid communication pathway between a liquid hydrogen peroxide source and the catalyst, the liquid hydrogen peroxide solution to the catalyst consisting essentially of manganese dioxide;

contacting, the catalyst consisting essentially of manganese dioxide with the liquid hydrogen peroxide solution to decompose the liquid hydrogen peroxide solution into oxygen and steam and produce the steam, wherein the steam is produced primarily by the decomposition of the liquid hydrogen peroxide solution into oxygen and steam and not primarily by combustion, the liquid hydrogen peroxide solution having a concentration below a self-heat concentration of the liquid hydrogen peroxide solution and less than 70 weight percent and greater than 30 weight percent; and conducting, by a second coupling comprising a second fluid communication pathway, the steam away from the catalyst consisting essentially of manganese dioxide.

17. The method of claim 16, wherein the liquid hydrogen peroxide solution is applied to the catalyst for at least a day.

18. The method of claim 16, wherein the liquid hydrogen peroxide solution further comprises one or more stabilizers.

19. The method of claim 16, wherein the steam conducted by the second coupling away from the catalyst is further conducted to at least one of production tubing, pipelines, and tanks, wherein the steam at least one of cleans and clears the at least one of production tubing, pipelines, and tanks.

20. A method for producing steam generated primarily by decomposition of a liquid hydrogen peroxide solution into oxygen and steam, the steam being produced for use in stimulating a geologic formation from a location not located within the geologic formation, the method comprising:

providing, at the location not located within the geologic formation, a catalyst consisting essentially of manganese dioxide, and for decomposing the liquid hydrogen peroxide solution into oxygen and steam without combustion;

contacting, at the location not located within the geologic formation, the catalyst with the liquid hydrogen peroxide solution to decompose the liquid hydrogen peroxide solution into oxygen and steam and produce the steam remotely from the geologic formation, wherein the steam is produced primarily by the decomposition of the liquid hydrogen peroxide solution into oxygen and steam and not by combustion, the liquid hydrogen peroxide solution having a concentration below a self-heat concentration of the liquid hydrogen peroxide solution and less than about 64.7 weight percent and greater than 30 weight percent; and injecting the steam and not the liquid hydrogen peroxide solution into the geologic formation.

21. A method for producing steam generated primarily by decomposition of a liquid hydrogen peroxide solution, the steam being produced for use in stimulating a geologic formation from a location not located within the geologic formation, the method comprising:

providing, at the location not located within the geologic formation, an active catalyst for decomposing the liquid hydrogen peroxide solution and consisting essentially of manganese dioxide, wherein the liquid hydrogen peroxide solution is decomposed primarily in response to exposure to the manganese dioxide;

contacting the manganese dioxide with the liquid hydrogen peroxide solution at the location not located within the geologic formation to decompose the liquid hydrogen peroxide solution into oxygen and steam and produce the steam at the manganese dioxide not located within the geologic formation, wherein the steam is produced primarily by the decomposition of the liquid hydrogen peroxide solution into oxygen and steam and not primarily by combustion, the liquid hydrogen peroxide solution having a concentration below a self-heat concentration of the liquid hydrogen peroxide solution and less than about 64.7 weight percent and greater than 30 weight percent; and injecting the steam from the location not located within the geologic formation into the geologic formation.

22. An apparatus for producing steam generated primarily by decomposition of a liquid hydrogen peroxide solution, wherein the steam is produced for use in stimulating a geologic formation from a location not located within the geologic formation, the apparatus comprising: a body impregnated with a catalyst consisting essentially of manganese dioxide and not located within the geologic formation and for decomposing the liquid hydrogen peroxide solution into oxygen and steam primarily in response to contact with the body to produce the steam at the catalyst not located within the geologic formation, wherein the steam is produced primarily by the decomposition of the liquid hydrogen peroxide solution into oxygen and steam in response to contact with the body and not primarily by combustion; a liquid hydrogen peroxide source, wherein the liquid hydrogen peroxide source is positioned at the location not located within the geologic formation and configured to contain the liquid hydrogen peroxide solution, the liquid hydrogen peroxide solution having a concentration below a self-heat concentration of the liquid hydrogen peroxide solution and less than about 64.7 weight percent and greater than 30 weight percent, the liquid hydrogen peroxide solution not substantially entering the geological formation; a first coupling configured to provide a first fluid communication pathway between the liquid hydrogen peroxide source and the catalyst body; and a second coupling configured to provide a second fluid communication pathway between the catalyst body and the geologic formation, wherein the second fluid communication pathway communicates steam to the geologic formation.

* * * * *